United States Patent [19]

Pellerin et al.

[11] 4,025,827

[45] May 24, 1977

[54] ELECTROLYTIC CAPACITOR HAVING A HIGHLY STRAINED ELASTOMERIC SEALING ELEMENT

[75] Inventors: William F. Pellerin, Bennington, Vt.; Stephen C. Lovely, Williamstown, Mass.

[73] Assignee: Sprague Electric Company, North Adams, Mass.

[22] Filed: Apr. 7, 1976

[21] Appl. No.: 674,516

[52] U.S. Cl. ................................ 361/433; 29/570
[51] Int. Cl.² ........................................ H01G 9/00
[58] Field of Search ................ 317/230; 29/570; 174/52 S

[56] References Cited

UNITED STATES PATENTS

| 3,321,675 | 5/1967 | Diggens | 317/230 |
|---|---|---|---|
| 3,534,230 | 10/1970 | Krasienko et al. | 317/230 |
| 3,684,927 | 8/1972 | Correll | 317/230 |

Primary Examiner—Michael J. Lynch
Assistant Examiner—James W. Davie
Attorney, Agent, or Firm—Connolly and Hutz

[57] ABSTRACT

A porous valve-metal capacitor is housed in a metal can and sealed therein by means of an outer glass-to-metal seal, an elastomeric bung and an inner plastic sealing member. The bung is compressed between these inner and outer sealing members so as to be highly strained, the ratio of the compressed to the uncompressed diameters thereof being at least 1.25 and the elastomeric bung being squeezed out radially to occupy at least 75% of the interface area between the inner and outer seals. This capacitor is capable of meeting the requirements of a severe test after 200 cycles from −55° C to 125° C.

7 Claims, 1 Drawing Figure

ELECTROLYTIC CAPACITOR HAVING A HIGHLY STRAINED ELASTOMERIC SEALING ELEMENT

BACKGROUND OF THE INVENTION

This invention relates to an electrolytic capacitor having a highly strained elastomeric sealing element, and more particularly to such a capacitor having a wet electrolyte and a package sealing structure wherein the elastomeric element is compressed between an inner plastic sealing member and a glass-to-metal outer seal.

Electrolytic capacitor assemblies employing an outer glass-to-metal seal generally include a solder bead that joins the metal periphery of the glass-to-metal seal to the open end of the capacitor can. The anode wire of the capacitor usually exits the package through a metal tubular eyelet that is central to the outer seal. A specialized need has recently been made known in the industry for a wet electrolyte capacitor that can withstand 200 cycles of temperature cycling from −55° to 125° C after which there should be no evidence of electrolyte attack and corrosion of the solder bead and no higher d.c. leakage current than 200% of the initial rated d.c. leakage limit. No more than one failure would be allowed in each group of 32 capacitors tested. During severe temperature cycling, the repetitive relative movement of the sealing elements due to differential thermal coefficients of expansion tend to rupture the seals that had been formed between the sealing elements. In particular, the most prevalent rupturing of the seal tends to occur between the anode riser wire and the inner sealing member or members, admitting liquid electrolyte to the glass surface that insulates the anode from the can or cathode. This results in a d.c. leakage current path shunting the capacitor and further admits the liquid electrolyte to the solder bead region where corrosion and eventually electrolyte leakage may occur. Also, the smaller the diameter of the capacitor becomes, the more difficult it is to make a capacitor seal that is capable of meeting this thermal cycling test.

It is a primary object of this invention to provide a wet electrolyte capacitor that is capable of meeting the above noted severe temperature cycling test.

It is a more narrow object of this invention to provide a sealing structure for a wet electrolyte capacitor that is especially suitable for use in small diameter capacitors, e.g. less than 0.220 inch (0.559 cm).

SUMMARY OF THE INVENTION

An electrolytic capacitor is sealed within a cylindrical metal can. The can has a bottom end and an opposite open end. A porous cylindrical valve metal capacitor anode has a coaxially extending valve metal wire attached to an end face. A liquid electrolyte and the capacitor anode are contained within the can. An insulating spacer is positioned in the bottom of the can. A cylindrical plastic fluorocarbon sealing member is positioned against the anode. An elastomeric bung is placed over the plastic member. A glass-to-metal header is placed over the elastomeric bung. The anode wire passes centrally through the plastic member, bung and the header. The bung, the plastic member, the anode and the spacer are compressed axially between the bottom of the can and the header, and the header is sealed and bonded to the lip of the open end of the can. The plastic member is sealed to the side wall of the can. A peripheral portion of the compressed plastic member is caused to project into a portion of the space between the anode and the side walls of the can. The elastomeric bung is squeezed out radially to occupy more than 75% of the interface area between the header and the plastic member, and is compressed about the anode wire. The bung in the unstressed condition has an average diameter as measured in the radial direction with reference to the anode wire which average diameter is no greater than 0.7 times the diameter of the plastic member. The diameter of the compressed bung is at least 3 times larger than the thickest section of the compressed bung taken in the axial direction.

The seal structure of this invention is especially well suited for use in small diameter capacitors e.g. less than 0.220 inch (0.559 cm), compared to known seals that typically employ an elastomeric element located in a central pocket of a plastic inner sealing member. The highly strained bung of this invention provides a self-adjusting feature tolerating a relatively broad deviation in dimensions of the adjacent sealing parts as well as tolerating a wide variation in assembly pressure and other process conditions without adversely affecting the integrity of the seal.

DESCRIPTION OF THE PREFERRED EMBODIMENT

Figure 1:
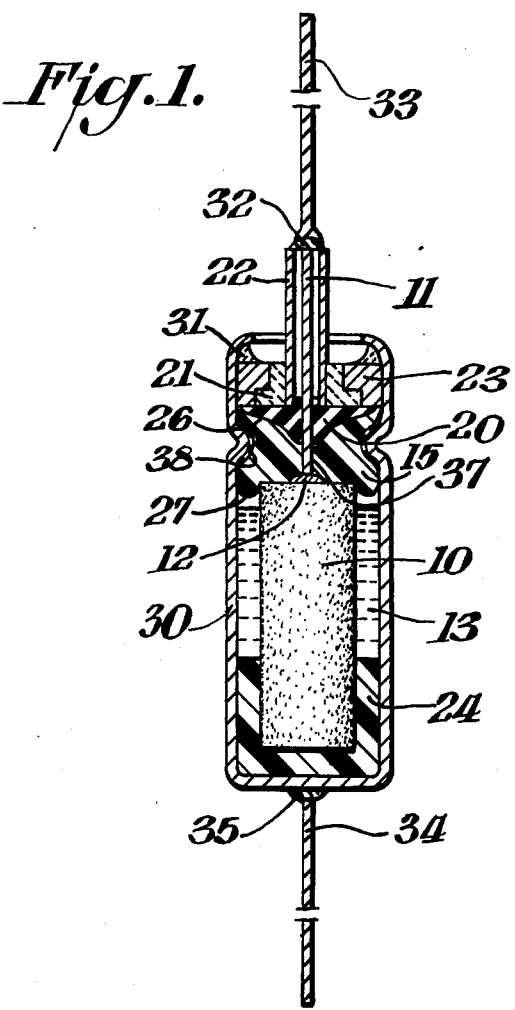
FIG. 1 shows in a side sectional view a sealed electrolytic capacitor of this invention.

A wet electrolyte capacitor of this invention is shown in FIG. 1 having a porous cylindrical tantalum anode 10 with a tantalum anode wire 11 affixed thereto by means of a weld 12. The anode 10 has a tantalum oxide film (not shown) formed over all the surfaces including surfaces within the pores. The anode is immersed in a liquid electrolyte 13. A plastic sealing member or gasket 15, also of cylindrical shape, has a hole coaxially located therein through which the anode wire 11 extends. An elastomeric bung 20 is positioned over the plastic member 15 with the anode wire 11 further extending centrally therethrough. A glass-to-metal header is comprised of a mass of glass 21 that surrounds and is fused to a tubular metal eyelet 22, the glass 21 being surrounded by and fused to a metal ring 23. A cylindrical metal can 30 has only one open end. A plastic spacer 24 is positioned in the bottom of the can 30. The elastomeric bung 20, the plastic sealing member 15, the anode 10, and the spacer 24 are assembled in that order within the can and are compressed between the header and the bottom of the can. The lip of the open end of the metal can is bent over the outer edge of the header ring 23 and a solder joint 31 is made about the periphery of the ring 23 to the can 30, to form a physically strong connection and to seal the header to the can. The anode wire 11 extends through the eyelet 22 and is sealed thereto at the outer end by a weld joint 32. An external lead wire 33, preferably of nickel, is butt welded to the eyelet at the weld joint 32. A cathode lead wire 34 has a butt weld 35 at the outer bottom of the can 30.

Figure 2:
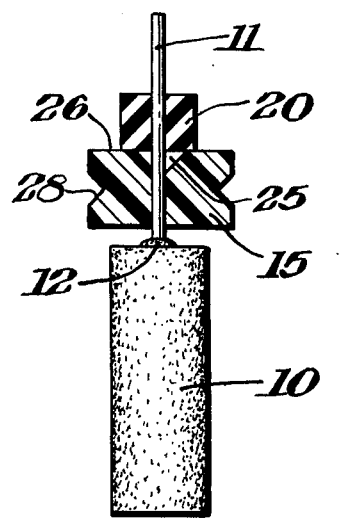
FIG. 2 shows in a side sectional view an assembly of the anode, the plastic sealing member and the elastomeric bung as seen prior to their insertion and compression within the completed capacitor of FIG. 1.

The capacitor of FIG. 1 is made by preparing the sintered cylindrical tantalum anode 10, welding the anode wire to a face of the anode and forming a dielectric oxide film over the surfaces of the anode by a well known anodizing method. The cylindrical plastic member 15, having an outer diameter larger than that of the anode is placed over the anode by threading the anode wire 11 through a hole provided therefor in the center of the plastic member. The diameters of the plastic member and the header are essentially the same dimension as the inner diameter of the can. The plastic member 15 has a conical depression 25 centrally located in its outer end surface 26. This assembly is illustrated in FIG. 2. The elastomeric bung 20, also having a centrally located hole, is then threaded over the anode wire 11. The unstressed bung 20 in this preferred embodiment is also cylindrical and has an outer diameter approximately half that of the plastic sealing member 15. However, in general the unstressed bung may have any other geometry such as a ball or a doughnut so long as it is essentially symmetrical about the anode wire and has an average diameter that is no greater than about 70% of the diameter of the plastic sealing member. This average diameter is measured as twice the radius with respect to the anode wire extending through the bung.

The plastic spacer 24 is then placed in the bottom of the can 30. The header tube 22 is threaded over the extending anode wire. The assembly of FIG. 2 with the header fitted thereto is inserted into the can. The liquid electrolyte 13 is introduced into the can. An axial force is applied to collectively compress the bung, the plastic member, the anode and the spacer between the header and the bottom of the can. A large enough force is applied to distort the plastic member 15 to the extent that a peripheral portion 27 thereof is forced into a portion of the space between the side walls of the cylindrical can 30 and the capacitor anode 10. The protruding portion 27 extends into this space a distance that is preferably at least 20% of the distance between the anode and inner wall of the can. The force is also made great enough to flatten the plastic member to the extent that the depression 25 in the surface thereof extends substantially over the entire area of the outer end face 26 of the plastic member. This is shown in FIG. 1. The elastomeric bung is squeezed out radially to occupy more than 75% and preferably at least 85% of the interface area between the header and the plastic sealing member. It should be noted that a cylindrically shaped bung having an unstressed diameter of 0.7 times the diameter of the plastic member would have a base area less than 50% of the interface area between the header and the plastic member. If it is now compressed within the capacitor assembly so as to occupy 75% of the interface area between plastic member and header, it will have experienced an area expansion of about 150%. This is a measure of the minimum bung strain to be achieved in a capacitor of this invention. It is also important to note that a compressed bung occupying 75% of the interface area would have a compressed diameter of about 0.87 times the diameter of the plastic member; if the unstressed diameter had been as large as 0.7 of the diameter of the plastic member, the bung would then be stretched radially to a diameter of at least 125% of the original value.

It is preferred in the capacitor of this invention to limit the relative volume of the elastomeric bung, further insuring that for a given axial compressive force a very high strain is achieved in the bung to provide a tight seal between the bung and the anode wire as well as to provide a tight compressive seal between the bung and the bottom surface of the header. Thus, the volume of the bung is such that in compression the average thickness of the bung in the axial direction (i.e., in directions parallel to the axis of the essentially coaxial assembly) is about 0.1 and no greater than 0.2 times the diameter of the plastic member.

On the other hand it is also preferred that the volume of the bung 20 be much larger than the volume of the unstressed depression 25 in the plastic sealing member 15, in order to further promote a gross distortion of the bung, a high strain and a substantial coverage of the inner surface of the header. From a consideration of these objectives, it is preferred that the volume of the bung should exceed that of the unstressed depression in the plastic member by at least a factor of 3 and preferably by a factor of about 10 without even accounting for the anode wire that occupies a part of the space in the depression. In the limit there may be no depression in the unstressed plastic member, which construction would be particularly appropriate for use in very small capacitors, e.g. having a diameter considerably smaller than 0.22 inch.

When all of these conditions are met, it has been found that the diameter of the compressed bung is always at least three times greater than the maximum thickness of the compressed bung. Also, the maximum thickness of the compressed bung in the axial direction is greatest at the centrally extending anode wire and is progressively thinner toward the side walls of the can.

The average diameter of the unstressed bung being confined to a no greater dimension than 0.7 of that of the plastic member has the effect of creating a greater pressure and therefore greater depth in the compressed depression of the plastic member near the center thereof than exists at points progressively farther away from the center. This generally tapered geometry of the depression and thus of the compressed bung therefore occurs whether or not the unstressed plastic member contains a depression. The pressure of the highly distorted elastomeric bung that is created in the vicinity of the anode wire and in the vicinity of the glass is believed to be much greater under all service conditions than in heretofore known capacitor seals and is thought to be responsible for the improved seal in these regions. The structure of a capacitor of this invention including the highly strained bung feature may be achieved by employing a plastic member that has in the virgin uncompressed condition an extensive shallow depression similar to that illustrated in FIG. 1.

The preferred material of the elastomeric bung is ethylenepropylene rubber but other elastomers being inert to the electrolyte used and having a compression set characteristic less than 10% may be used. For example silicon rubber, butyl rubber, Viton (a copolymer of vinylidenefluoride and hexafluoropropylene), and Hypalon may be suitable. The latter two are trade names of E. I. DuPont de Nemours Co., of Wilmington, Del.

Polytetrafluoroethylene (PTF Teflon, a Tradename of DuPont) is preferred as the material of the plastic sealing member although other relatively inelastic fluoroplastics are suitable such as polychlorotrifluoroethylene and vinylidenefluoride, also being chemically inert to most electrolytes in common use.

A soft tacky adhesive such as polybutadiene may be applied to the anode wire as indicated by numeral 37, and to the outer periphery of the plastic member as indicated by the numeral 38 in FIG. 1, each being illustrated by a heavy line. Other appropriate sealing and caulking hydrocarbons are disclosed in the patent U.S. Pat. No. 3,056,072 issued Sept. 25, 1962 and assigned to the same assignee.

The spacer 24 may be of PTF Teflon, the can 30 of silver and the metal ring 23 and eyelet 22 of the header may be of steel having a tin coating. The electrolyte 13 may be a sulphuric acid solution or any other of a wide variety of highly conductive electrolytes.

A number of capacitors were made in accordance with this invention. The plastic member was a disc of polytetrafluoroethylene having an outer diameter of 0.159 inch (0.40 cm) and a thickness of 0.083 inch (0.21 cm). A conical depression in an outer end face had a base diameter of 0.060 inch (0.15 cm) and a depth of 0.030 inch (0.076 cm) in the unstressed condition. The elastomeric bung was a cylinder of ethylenepropylene rubber having a diameter of 0.084 inch (0.21 cm) and a height of 0.060 inch (0.15 cm). The drawings of FIGS. 1 and 2 are intended to be scale drawings of these experimental capacitors.

After the units were assembled, a unit was sectioned to determine the nature of the internal structure as is illustrated in FIG. 1. The maximum thickness of the rubber bung at the center was 0.040 inch (0.10 cm) and the overall diameter of the compressed bung was about 0.14 inch (0.355 cm). The average thickness of the compressed bung in the axial direction was 0.125 times the diameter of the plastic member. Another capacitor was opened and the bung was found to have returned to its original dimensions within 5% and thus its compression set characteristic was 5% as actually measured in this construction.

Three groups of 32 pieces each of the experimental capacitors were subjected to repetitive temperature cycling from −55° to 125° C. After cycling the d.c. leakage current of each was measured and a capacitor having a leakage greater than 2.0 microamperes was designated a DCL failure since the rated initial leakage for this unit is 1.0 microamperes. Also, each unit was inspected under a 10 power microscope and any capacitor showing evidence of corrosion of the solder joint between the can and the header ring was designated a corrosion failure. The number of failures occurring are shown in Table I below.

Table I

| Lot | No. of pieces | DCL | Corrosion |
|---|---|---|---|
| | | (after 200 thermal cycles) | |
| A | 32 | 0 | 0 |
| B | 32 | 0 | 0 |
| C | 32 | 0 | 1 |
| | | (after 400 thermal cycles) | |
| A | 32 | 5 | 1 |
| B | 32 | 3 | 1 |
| C | 32 | 4 | 3 |

Thus, a small capacitor of this invention is capable of meeting the new severe 200 thermal cycles test.

What is claimed is:

1. A sealed electrolytic capacitor comprising: a cylindrical metal can having a bottom end and an opposite open end; a porous cylindrical valve-metal capacitor anode having a coaxially extending valve-metal wire attached to an end face thereof; a liquid electrolyte being contained within said metal can and said anode being contained coaxially within and spaced from the side walls of said metal can; an insulating spacer being positioned in said bottom end of said can; a plastic fluorocarbon sealing member being positioned against said capacitor section and sealed within said open end of said can, said anode wire extending centrally through said plastic member, said plastic member having a generally cylindrical shape and a centrally located depression at the outer end face thereof; a header comprising a mass of glass surrounding and fused to a tubular metal eyelet and surrounded by and fused to an outer metal ring; and an elastomeric bung being positioned between said header and said plastic member and having said anode wire extending centrally therethrough, said elastomeric bung in the unstressed condition having an average diameter as measured in the radial direction with reference to said anode wire which average diameter is no greater than 0.7 times the diameter of said cylindrical plastic member, said elastomeric bung, said plastic member, said capacitor anode and said spacer all being axially compressed between said header and said bottom end of said can, said elastomeric bung being squeezed out radially to occupy more than 75% of the interface area between said header and said plastic member, the ratio of the diameter of the maximum thickness of said compressed bung being greater than 3:1, a peripheral portion of said compressed plastic member projecting into a portion of the space between the side walls of said cylindrical can and said capacitor anode, said anode wire being electrically attached and sealed within said metal eyelet of said header, the lip of said open end of said metal can being sealed and bonded to said metal ring of said header.

2. The capacitor of claim 1 wherein the average thickness of said compressed bung as measured in an axial direction relative to said coaxially extending anode wire is less than 0.2 times said diameter of said plastic member.

3. The capacitor of claim 1 wherein said elastomeric bung has a compression set characteristic less than 10% such that upon removal of the bung from said can the bung returns to within 10% of its original dimensions, to maintain within said capacitor a resilient compressive seal between said bung and said adjacent wire and header under conditions of extreme temperature variations.

4. The capacitor of claim 1 wherein the thickness of said compressed bung in the axial direction is greatest at said centrally extending anode wire and is progressively thinner toward said side walls of said can.

5. The capacitor of claim 1 wherein said metal can has an annular inwardly directed groove that is pressed into the peripheral side of said cylindrical plastic member and sealed thereto.

6. The capacitor of claim 1 wherein said elastomeric bung is made of ethylenepropylene rubber.

7. The capacitor of claim 1 wherein said plastic sealing member is made of polytetrafluoroethylene.

* * * * *

UNITED STATES PATENT OFFICE
CERTIFICATE OF CORRECTION

Patent No. 4,025,827   Dated May 24, 1977

Inventor(s) William F. Pellerin et al

It is certified that error appears in the above-identified patent and that said Letters Patent are hereby corrected as shown below:

Cover page, beneath "[57] ABSTRACT", "7 Claims, 1 Drawing Figure" should read -- 7 Claims, 2 Drawing Figures --

Column 4, line 55, "silicon" should read -- silicone --

Column 5, line 3, "Pat. No." should be deleted

Column 5, line 36, "-55°" should read -- -55°C --

Claim 1, line 32, (Column 6, line 28), "of" (first occurrence) should read -- to --

Signed and Sealed this sixteenth Day of August 1977

[SEAL]

Attest:

RUTH C. MASON
Attesting Officer

C. MARSHALL DANN
Commissioner of Patents and Trademark.